US012799346B2

(12) United States Patent
Yamaguchi et al.

(10) Patent No.: US 12,799,346 B2
(45) Date of Patent: Nov. 17, 2026

(54) COMPOSITION FOR COATING AND COATED ARTICLE

(71) Applicant: DAIKIN INDUSTRIES, LTD., Osaka (JP)

(72) Inventors: Seitaro Yamaguchi, Osaka (JP); Yukari Honda, Osaka (JP); Yasukazu Nakatani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 185 days.

(21) Appl. No.: 18/426,540

(22) Filed: Jan. 30, 2024

(65) Prior Publication Data

US 2024/0182742 A1 Jun. 6, 2024

Related U.S. Application Data

(63) Continuation of application No. PCT/JP2022/029271, filed on Jul. 29, 2022.

(30) Foreign Application Priority Data

Aug. 6, 2021 (JP) ................................ 2021-129583

(51) Int. Cl.

| | |
|---|---|
| ***C09D 127/18*** | (2006.01) |
| ***C09D 5/02*** | (2006.01) |
| ***C09D 179/08*** | (2006.01) |
| ***C09D 181/06*** | (2006.01) |

(52) U.S. Cl.

CPC ............. *C09D 127/18* (2013.01); *C09D 5/02* (2013.01); *C09D 179/08* (2013.01); *C09D 181/06* (2013.01)

(58) Field of Classification Search

None

See application file for complete search history.

(56) References Cited

U.S. PATENT DOCUMENTS

| | | | | |
|---|---|---|---|---|
| 5,434,001 A | | 7/1995 | Yamada et al. | |
| 6,333,372 B1 | * | 12/2001 | Tomihashi ............. | C09D 5/002 524/514 |
| 2007/0231563 A1 | | 10/2007 | Adams et al. | |
| 2018/0037765 A1 | * | 2/2018 | Tamura ................ | C09D 127/20 |

FOREIGN PATENT DOCUMENTS

| | | | | | |
|---|---|---|---|---|---|
| CN | 112480757 A | | 3/2021 | | |
| JP | 5-39451 A | | 2/1993 | | |
| JP | 11-349887 A | | 12/1999 | | |
| JP | 2003-053261 A | | 2/2003 | | |
| JP | 2004204073 A | * | 7/2004 | | |
| JP | 2009-532247 A | | 9/2009 | | |
| JP | 2020-176216 A | | 10/2020 | | |
| WO | WO-2007114941 A2 | * | 10/2007 | ........... | C09D 127/00 |

OTHER PUBLICATIONS

International Search Report for PCT/JP2022/029271 dated Oct. 25, 2022.

International Preliminary Report on Patentability dated Feb. 6, 2024 with a Translation of the Written Opinion of the International Searching Authority in Application No. PCT/JP2022/029271.

* cited by examiner

*Primary Examiner* — Michael P. Rodriguez

(74) *Attorney, Agent, or Firm* — Sughrue Mion, PLLC

(57) ABSTRACT

A covering composition in which a heat-resistant resin (A), a non melt-processible fluorine-containing polymer (B) and a melt-processible fluorine-containing polymer (C) are dispersed in a water medium. The particulate resins (A) to (C) have an average particle size of 0.1 to 10 μm, and the covering composition is substantially free from methylcellulose. Also disclosed is a covered article including a substrate; a primer layer formed by directly applying the covering composition to the substrate; and a topcoat layer containing a fluorine-containing polymer.

11 Claims, No Drawings

COMPOSITION FOR COATING AND COATED ARTICLE

CROSS REFERENCE TO RELATED APPLICATIONS

This application is a Rule 53(b) Continuation of International Application No. PCT/JP2022/029271 filed Jul. 29, 2022, which claims priority from Japanese patent application No. 2021-129583 filed Aug. 6, 2021, the respective disclosures of all of which are incorporated herein by reference in their entireties.

TECHNICAL FIELD

The present disclosure relates to a covering composition and a covered article.

BACKGROUND ART

Fluororesins such as polytetrafluoroethylene, tetrafluoroethylene/perfluoro (alkyl vinyl ether) copolymers and tetrafluoroethylene/hexafluoropropylene copolymers are widely used for processing the surfaces of food industry articles, cookware and kitchen utensils such as frying pans and pots, household articles such as irons, electric industry articles, and machinery industry articles because those fluororesins have a low friction coefficient, and are excellent in properties such as non-stickiness and heat resistance.

Patent Literature 1 discloses a covering composition comprising a polyether sulfone resin, a polyimide-based resin, a non melt-processible fluorine-containing polymer, and a melt-processible fluorine-containing polymer.

Patent Literature 2 discloses a covering composition comprising a fluororesin, a heat-resistant binder, and a heat stabilizer.

CITATION LIST

Patent Literature

Patent Literature 1: Japanese Patent Laid-Open No. 2020-176216

Patent Literature 2: Japanese Patent Laid-Open No. 2003-53261

SUMMARY

The present disclosure provides a covering composition in which a heat-resistant resin (A), a non melt-processible fluorine-containing polymer (B) and a melt-processible fluorine-containing polymer (C) are dispersed in a water medium, the particulate resins (A) to (C) have an average particle size of 0.1 to 10 μm, and the covering composition is substantially free from methylcellulose.

Advantageous Effect

According to the present disclosure, it is possible to form a covering having good coating film properties.

DESCRIPTION OF EMBODIMENTS

Hereinafter, the present disclosure will be described in detail.

The present disclosure provides a covering composition in which a heat-resistant resin (A), a non melt-processible fluorine-containing polymer (B) and a melt-processible fluorine-containing polymer (C) are dispersed in a water medium, the particulate resins (A) to (C) have an average particle size of 0.1 to 10 μm, and the covering composition is substantially free from methylcellulose.

A covering composition comprising the components (A) to (C) generally contains methylcellulose as a thickener for securing coating properties. However, a covering composition containing such methylcellulose may be bubbled in a spray coating step, resulting in a negative impact on coating film performance.

Thus, the present disclosure is characterized by being substantially free from methylcellulose. Surprisingly, this enables suppression of bubbling of a coating material during spray coating. It is presumed that while methylcellulose is dissolved in a medium to increase the viscosity of the medium, so that generated bubbles are stabilized, the viscosity of the medium is reduced to accelerate bubble breakage due to being substantially free from methylcellulose. This characteristic is also preferable from the viewpoint that problems such as deterioration of coating film properties and the like due to bubbling do not occur. Specifically, if there is little bubbling, the corrosion resistance of the coating film is improved because the number of voids in the coating film decreases. Herein, the term “substantially free from methylcellulose” means that the amount of methylcellulose is less than 0.050 mass % with respect to the total amount of the coating material. The amount of methylcellulose is more preferably 0.025 mass % or less. Alternatively, there may be no methylcellulose.

The covering composition of the present disclosure is substantially free from methylcellulose as described above, but if this causes an excessive decrease in viscosity, coating becomes difficult. For this reason, it is preferable to incorporate a nonionic surfactant having a HLB of 10 or less for the purpose of adjusting the viscosity. The use of such a lipophilic nonionic surfactant is preferable because the viscosity of the covering composition increases, resulting in improvement of coating properties. The surfactant also has an effect of improving the mechanical stability of the fluorine-containing polymer and heat-resistant resin dispersed in water, so that wettability over a metallic covered material during coating is improved.

In the present disclosure, the value of HLB is determined from the following equation by Griffin method.

$$HLB=20\times[(\text{molecular weight of hydrophilic groups in surfactant})/(\text{molecular weight of surfactant})]$$

In the covering composition of the present disclosure, examples of the chemical structure of the nonionic surfactant include, but not limited to, non-alkyl phenol-type nonionic surfactants.

The non-alkyl phenol-type nonionic surfactant is a nonionic surfactant having no benzene ring in the structure. Examples thereof include nonionic surfactants from a polyoxyethylene alkyl ether-based natural alcohol as a raw material.

The non-alkyl phenol-type nonionic surfactant (b) is preferably a nonionic surfactant represented by the following formula (I):

$$R—O\text{-}A\text{-}H \qquad (I)$$

wherein R represents a linear or branched saturated or unsaturated acyclic aliphatic hydrocarbon group having 8 to 19 carbon atoms, or saturated cyclic aliphatic hydrocarbon group having 8 to 19 carbon atoms. A represents a polyoxyalkylene chain having 3 to 25 oxyethylene units and 0 to 5 oxypropylene units.

The nonionic surfactant represented by the formula (I) is preferably a polyoxyethylene alkyl ether-based surfactant represented by the following formula (II):

$$C_xH_{2x+1}CH(C_yH_{2y+1})C_zH_{2z}O(C_2H_4O)_nH \quad (II)$$

wherein x represents an integer of 1 or more, y represents an integer of 1 or more and z represents an integer of 0 or 1, with the proviso that the sum of x+y+z is an integer of 8 to 18, and n represents an integer of 4 to 20, or a polyoxyethylene alkyl ether-based surfactant represented by the following formula (III):

$$C_xH_{2x+1}—O\text{-}A\text{-}H \quad (III)$$

wherein x represents an integer of 8 to 18, and A represents a polyoxyalkylene chain having 5 to 20 oxyethylene units and 1 or 2 oxypropylene units.

In the covering composition of the present disclosure, the blending amount of a nonionic surfactant having a HLB of 10 or less is preferably 2.0 to 10.0 mass % with respect to the total amount of the covering composition. The lower limit of the above-described amount is preferably 2.5 mass %, more preferably 3.0 mass %. The upper limit of the above-described amount is preferably 9.0 mass %, more preferably 8.0 mass %. The blending amount of a nonionic surfactant having a HLB of 11 or more is not limited, and is preferably 1.0 to 5.0 mass % with respect to the total amount of the covering composition.

The covering composition of the present disclosure has the heat-resistant resin (A), the non melt-processible fluorine-containing polymer (B) and the melt-processible fluorine-containing polymer (C) dispersed in a water medium. The particulate resins (A) to (C) have an average particle size of 0.1 to 10 μm. When the average particle size is within such a range, good dispersibility is achieved, stability of the composition can be secured, and the physical properties of the covered film can be improved.

The specific method for setting the average particle size of the particulate resins (A) to (C) to 0.1 to 10 μm is not limited, and may be a method in which as the components (A) to (C) used as raw materials, those having an average particle size within the range of 0.1 to 10 μm are taken and combined.

The average particle size of the particulate resins is measured by a laser diffraction-type particle size distribution measurement apparatus (Microtrac MT-3000 EXII Model manufactured by MicrotracBEL Corp.). The apparatus automatically calculates the average particle size (cumulative particle size at 50%).

Hereinafter, the components (A) to (C) will be described in detail.

The heat-resistant resin (A) means a resin that can be continuously used under the condition of 150° C. or higher. Among such resins, fluorine-containing resins are excluded. The fluorine-containing resins corresponding to the components (B) and (C) do not fall under the heat-resistant resin (A).

More specific examples include aromatic polyether ketone resins such as polyether ether ketone resins, polyphenylene sulfide resins, polyaryl ether ketone (PAEK), polyether ketone ketone (PEKK), polyether ketone (PEK) and polyether ether ketone ketone (PEEKK), polyether sulfone (PES), liquid crystal polymers (LCPs), polysulfone (PSF), amorphous polyarylate (PAR), polyether nitrile (PEN), thermoplastic polyimide (TPI), polyimide (PI), polyether imide (PEI), and polyamide imide (PAI).

Of these, polyamide imide and/or polyimide (A-1) are particularly preferable from the viewpoint of being excellent in bondability to metal.

Further, in some embodiments, polyamide imide and/or polyimide (A-1) and polyether sulfone (A-2) may be used in combination as the heat-resistant resin (A). The combined use of these resins is preferable from the viewpoint that the film has both corrosion resistance and steam resistance.

In this case, the mass ratio of polyamide imide and/or polyimide (A-1) to polyether sulfone (A-2) ((A-1):(A-2)) is preferably 85:15 to 65:35. It is preferable that the mass ratio be within the above-mentioned range from the viewpoint that the covering has good corrosion resistance and steam resistance. The mass ratio is more preferably in the range of 80:20 to 70:30.

The polyamide imide (PAI) is a resin comprising a polymer having an amide bond and an imide bond in the molecular structure. The PAI is not limited, and examples thereof include resins comprising a high-molecular-weight polymer obtained by any of a reaction between an aromatic diamine having an amide bond in the molecule and an aromatic tetravalent carboxylic acid such as pyromellitic acid; a reaction between an aromatic trivalent carboxylic acid such as trimellitic anhydride and a diamine such as 4,4-diaminophenyl ether or a diisocyanate such as diphenylmethane diisocyanate; a reaction between a dibasic acid having an aromatic imide ring in the molecule and a diamine; and the like. The PAI is preferably one comprising a polymer having an aromatic ring in the main chain from the viewpoint of being excellent in heat resistance.

The polyimide (PI) is a resin comprising a polymer having an imide bond in the molecular structure. The PI is not limited, and examples thereof include resins comprising a high-molecular-weight polymer obtained by a reaction of an aromatic tetravalent carboxylic anhydride such as pyromellitic anhydride, or the like. The PI is preferably one comprising a polymer having an aromatic ring in the main chain from the viewpoint of being excellent in heat resistance.

The polyether sulfone (PES) resin is a resin comprising a polymer having repeating units represented by the following formula:

[Chem. 1]

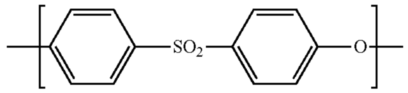

PES is not limited, and examples thereof include resins comprising a polymer obtained by polycondensation of dichlorodiphenyl sulfone and bisphenol.

The aromatic polyether ketone resin is a resin containing repeating units each comprising an arylene group, an ether group [—O-] and a carbonyl group [—C(=O)—]. Examples of the aromatic polyether ketone resin include polyether ketone (PEK) resins, polyether ether ketone (PEEK) resins, polyether ether ketone ketone (PEEKK) resins, and polyether ketone ester resins. One of the aromatic polyether ketone resins may be used alone, or two or more thereof may be used in combination.

The aromatic polyether ketone resin is preferably at least one selected from the group consisting of PEK, PEEK, PEEKK and polyether ketone ester resins, more preferably PEEK.

The covering composition of the present disclosure further comprises a non melt-processible fluorine-containing polymer (B). The term "non melt-processible" means a property of being unable to measure a melt flow rate at a temperature higher than a melting point in accordance with ASTM D-1238 and D-2116.

The non melt-processible fluorine-containing polymer (B) is preferably non melt-processible polytetrafluoroethylene (PTFE).

The non melt-processible PTFE is preferably fibrillatable. The term "fibrillatable" refers to a property of being easily fiberized to form fibrils. Whether the resin is fibrillatable or not can be determined by "paste extrusion" which is a typical method for molding "high-molecular-weight PTFE powder" that is powder made from a polymer of TFE. Normally, paste extrusion is possible because high-molecular-weight PTFE is fibrillatable. If un-sintered molded product obtained by paste extrusion does not have substantial strength or elongation, for example, breakage occurs at a tensile elongation of 0%, it can be determined that the resin is not fibrillatable.

The standard specific gravity (SSG) of the non melt-processible PTFE is preferably 2.130 to 2.230. The SSG is more preferably 2.130 to 2.190, further more preferably 2.140 to 2.170. When the SSG of the non melt-processible PTFE is within the above-described range, it is possible to form a coating film further excellent in corrosion resistance. The value of SSG is measured in accordance with ASTM D 4895.

Preferably, the non melt-processible PTFE has a peak top (DSC melting point) at 333 to 347° C. on a heat-of-fusion curve obtained by a differential scanning calorimeter set at a temperature-increasing rate of 10° C./min with the non melt-processible PTFE having no history of being heated to a temperature of 300° C. or higher. The non melt-processible PTFE has a peak top more preferably at 333 to 345° C., further more preferably at 340 to 345° C. When the peak top (DSC melting point) is within the above-described range, it is possible to form a coating film further excellent in corrosion resistance.

More specifically, for example, RDC 220 (manufactured by SII Nanotechnologies Inc.) subjected to temperature calibration using indium and lead as standard samples in advance is used as the differential scanning calorimeter (DSC). About 3 mg of PTFE powder is put in an aluminum pan (crimped container), and heated at 10° C./min over a temperature range of 250 to 380° C. in an air flow at 200 ml/min. The quantity of heat is calibrated using indium, lead and tin as standard samples, and the empty aluminum pan is sealed, and used for the measurement reference. The obtained heat-of-fusion curve is processed with Muse Standard Analysis Software (manufactured by SII Nanotechnologies Inc.), and a temperature indicating a peak top of the quantity of heat of melting is defined as a DSC melting point.

The non melt-processible PTFE is preferably at least one selected from the group consisting of a tetrafluoroethylene homopolymer (hereinafter, also referred to as "homo PTFE") and a modified polytetrafluoroethylene (hereinafter, also referred to as "modified PTFE").

The modified PTFE is modified PTFE comprising tetrafluoroethylene (TFE), and a monomer other than TFE (hereinafter, also referred to as a "modifying monomer").

The modifying monomer is not limited as long as it is copolymerizable with TFE, and examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ether; and perfluoroalkyl ethylene, and ethylene. One modifying monomer may be used, or two or more modifying monomers may be used.

The perfluorovinyl ether is not limited, and examples thereof include unsaturated perfluoro compounds represented by the following formula (1):

$$CF_2{=}CF{-}ORf^1 \quad (1)$$

wherein $Rf^1$ represents a perfluoro organic group. The term "perfluoro organic group" as used herein means an organic group in which hydrogen atoms bonded to carbon atoms are all replaced by fluorine atoms. In some embodiments, the perfluoro organic group may have ether oxygen.

Examples of the perfluorovinyl ether include perfluoro (alkyl vinyl ether) (PAVE) of the formula (1) in which $Rf^1$ is a perfluoroalkyl group having 1 to 10 carbon atoms. The number of carbon atoms in the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group, and the perfluoroalkyl group is preferably a perfluoropropyl group. That is, the PAVE is preferably perfluoropropyl vinyl ether (PPVE).

Further, examples of the perfluorovinyl ether include compounds of the formula (1) in which $Rf^1$ is a perfluoro (alkoxyalkyl) group having 4 to 9 carbon atoms, $Rf^1$ is a group represented by the following formula:

[Chem. 2]

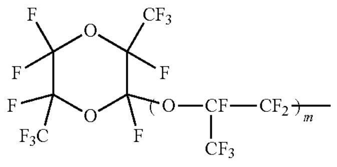

wherein m represents an integer of 0 or 1 to 4, or $Rf^1$ is a group represented by the following formula:

[Chem. 3]

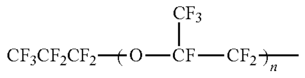

wherein n represents an integer of 1 to 4.

The perfluoroalkyl ethylene (PFAE) is not limited, and examples thereof include perfluorobutyl ethylene (PFBE), and perfluorohexyl ethylene.

The modifying monomer in the modified PTFE is preferably at least one selected from the group consisting of HFP, CTFE, VDF, PAVE, PFAE and ethylene, more preferably PAVE, further more preferably PPVE.

The homo PTFE is preferably one consisting substantially only of TFE units, for example, one obtained without using a modifying monomer.

In the modified PTFE, the content of modifying monomer units is preferably 0.001 to 2 mol %, more preferably 0.001 to 1 mol %.

The contents of the respective monomer units of the non melt-processible fluorine-containing polymer can be calculated by appropriately combining NMR, FT-IR, elemental analysis and X-ray fluorescence analysis according to the type of monomer.

The covering composition of the present disclosure further comprises a melt-processible fluorine-containing polymer (C). The term "melt-processible" means that a polymer can be melted and processed using conventional processing devices such as an extruder and an injection molding machine. Therefore, the melt-processible fluorine-containing polymer normally has a melt flow rate (MFR) of 0.01 to 100 g/10 min.

The term "MFR" as used herein refers to a value given as a mass of a polymer flowing out per 10 minutes (g/10 min) through a nozzle with an inner diameter of 2 mm and a length of 8 mm at a measurement temperature (for example, 372° C. for PFA and FEP, 297° C. for ETFE) and a load (for example, 5 kg for PFA, FEP and ETFE) determined by the type of fluoropolymer, wherein the measurement is performed in accordance with ASTM D 1238 using a melt indexer (manufactured by Yasuda Seiki Seisakusho, Ltd.).

The melting point of the melt-processible fluorine-containing polymer (C) is preferably 100 to 333° C., more preferably 140° C. or higher, further more preferably 160° C. or higher, particularly preferably 180° C. or higher, and more preferably 332° C. or lower, further more preferably lower than 322° C., particularly preferably 320° C. or lower.

Herein, the melting point of the melt-processible fluorine-containing polymer (C) is a temperature corresponding to a maximum value on a heat-of-fusion curve obtained by increasing the temperature at a rate of 10° C./min using a differential scanning calorimeter [DSC].

The melt-processible fluorine-containing polymer (C) is at least one selected from the group consisting of low-molecular-weight PTFE, a TFE/PAVE copolymer (PFA), a TFE/HFP copolymer (FEP), an ethylene (Et)/TFE copolymer (ETFE), an Et/TFE/HFP copolymer, polychlorotrifluoroethylene (PCTFE), a CTFE/TFE copolymer, an Et/CTFE copolymer and polyvinylidene fluoride (PVDF).

The melt-processible fluorine-containing polymer (C) is preferably at least one selected from the group consisting of FEP and PFA, more preferably FEP, from the viewpoint of obtaining a coating film further excellent in corrosion resistance.

The FEP is not limited, and is preferably a copolymer in which the molar ratio of TFE units to HFP units (TFE units/HFP units) is 70/30 or more and less than 99/1. The molar ratio is more preferably 70/30 or more and 98.9/1.1 or less, further more preferably 80/20 or more and 98.9/1.1 or less. If the content of TFE units is excessively small, mechanical properties tend to be deteriorated, and if the content of TFE units is excessively large, the melting point tends to become excessively high, resulting in deterioration of moldability. It is also preferable that the FEP be a copolymer in which the content of monomer units derived from a monomer copolymerizable with TFE and HFP is 0.1 to 10 mol %, and the total content of TFE units and HFP units is 90 to 99.9 mol %. Examples of the monomer copolymerizable with TFE and HFP include PAVE, and alkyl perfluorovinyl ether derivatives represented by $CF_2{=}CF{-}OCH_2{-}Rf^2$ wherein $Rf^2$ represents a perfluoroalkyl group having 1 to 5 carbon atoms).

The melting point of the FEP is preferably lower than 150 to 322° C., more preferably 200 to 320° C., further more preferably 240 to 320° C.

The MFR of the FEP is preferably 1 to 100 g/10 min.

The initial pyrolysis temperature of the FEP is preferably 360° C. or higher. The initial pyrolysis temperature is more preferably 380° C. or higher, further more preferably 390° C. or higher.

The term "initial pyrolysis temperature" as used herein refers to a temperature at which the amount of a sample decreases by 1 mass % when 10 mg of the sample is heated at a temperature-increasing rate of 10° C./min from room temperature using a thermogravimetric/differential thermal analyzer [TG-DTA] (trade name: TG/DTA 6200, manufactured by Seiko Electronics Inc.).

The PFA is not limited, and is preferably a copolymer in which the molar ratio of TFE units to PAVE units (TFE units/PAVE units) is 70/30 or more and less than 99/1. The molar ratio is more preferably 70/30 or more and 98.9/1.1 or less, further more preferably 80/20 or more and 98.9/1.1 or less. If the content of TFE units is excessively small, mechanical properties tend to be deteriorated, and if the content of TFE units is excessively large, the melting point tends to become excessively high, resulting in deterioration of moldability. It is also preferable that the PFA be a copolymer in which the content of monomer units derived from a monomer copolymerizable with TFE and PAVE is 0.1 to 10 mol %, and the total content of TFE units and PAVE units is 90 to 99.9 mol %. Examples of the monomer copolymerizable with TFE and PAVE include HFP, vinyl monomers represented by $CZ^1Z^2{=}CZ^3\ (CF_2)_nZ^4$ wherein $Z^1$, $Z^2$ and $Z^3$ are the same or different, and each represents a hydrogen atom or a fluorine atom, $Z^4$ represents a hydrogen atom, a fluorine atom or a chlorine atom, and n represents an integer of 2 to 10), and alkyl perfluorovinyl ether derivatives represented by $CF_2{=}CF{-}OCH_2{-}Rf^2$ wherein $Rf^2$ represents a perfluoroalkyl group having 1 to 5 carbon atoms.

The melting point of the PFA is preferably 180° C. or higher and lower than 322° C., more preferably 230° C. to 320° C., further more preferably 280 to 320° C.

The melt flow rate (MFR) of the PFA is preferably 1 to 100 g/10 min.

The initial pyrolysis temperature of the PFA is preferably 380° C. or higher. The initial pyrolysis temperature is more preferably 400° C. or higher, further more preferably 410° C. or higher.

The contents of the respective monomer units of the melt-processible fluorine-containing polymer can be calculated by appropriately combining NMR, FT-IR, elemental analysis and X-ray fluorescence analysis according to the type of monomer.

From the viewpoint of the dispersion stability in the covering composition and the surface smoothness of the resulting coating film, the average particle size of the non melt-processible fluorine-containing polymer and the melt-processible fluorine-containing polymer is preferably 0.01 to 40 μm. The average particle size is more preferably 0.05 μm or more, and more preferably 20 μm or less, further more preferably 10 μm or less, particularly preferably 5 μm or less.

The average particle size can be measured by a laser light scattering method.

From the viewpoint of obtaining a coating film further excellent in corrosion resistance, the mass ratio of the total amount of the PES and the polyimide-based resin to the total amount of the non melt-processible fluorine-containing polymer and the melt-processible fluorine-containing polymer is preferably 15/85 to 35/65. The mass ratio is more preferably 20/80 or more, and more preferably 30/70 or less.

From the viewpoint of obtaining the coating film further excellent in corrosion resistance, the mass ratio of the non melt-processible fluorine-containing polymer to the melt-processible fluorine-containing polymer is preferably 5/95 to 95/5. The mass ratio is more preferably 20/80 or more, further more preferably 30/70 or more, even more preferably 40/60 or more, particularly preferably 50/50 or more, and more preferably 90/10 or less, further more preferably 80/20 or less, particularly preferably 70/30 or less.

The covering composition of the present disclosure has particulate resins dispersed in an aqueous medium.

In some embodiments, the covering composition of the present disclosure may comprise an organic solvent. The organic solvent is an organic compound, which is preferably liquid at a normal temperature of about 20° C.

Examples of the organic solvent include N-methyl-2-pyrrolidone (NMP), N-ethyl-2-pyrrolidone, N-butyl-2-pyrrolidone, 3-alkoxy-N,N-dimethylpropaneamide, γ-butyrolactone, dimethylsulfoxide, 1,3-dimethyl-2-imidazolidinone, 3-methyl-2-oxazolidinone, dimethylacetoamide, dimethylformamide, N-formylmorpholine, N-acetylmorpholine, dimethylpropyleneurea, anisole, diethyl ether, ethylene glycol, acetophenone, methyl ethyl ketone, methyl isobutyl ketone, cyclohexanone, cyclopentanone, xylene, toluene, ethanol, and 2-propanol. One of these organic solvents may be used, or two or more thereof may be used in combination.

The organic solvent is preferably at least one selected from the group consisting of N-ethyl-2-pyrrolidone, N-butyl-2-pyrrolidone, 3-alkoxy-N,N-dimethylpropaneamide, γ-butyrolactone, dimethylsulfoxide, 1,3-dimethyl-2-imidazolidinone, 3-methyl-2-oxazolidinone, dimethylacetoamide, dimethylformamide, N-formylmorpholine, N-acetylmorpholine, dimethylpropyleneurea, anisole, diethyl ether, ethylene glycol, acetophenone, methyl ethyl ketone, methyl isobutyl ketone, cyclohexanone, cyclopentanone, xylene, toluene, ethanol and 2-propanol, more preferably at least one selected from the group consisting of N-ethyl-2-pyrrolidone, N-butyl-2-pyrrolidone, 3-alkoxy-N,N-dimethylpropaneamide, γ-butyrolactone, dimethylsulfoxide, 1,3-dimethyl-2-imidazolidinone, 3-methyl-2-oxazolidinone, dimethylacetoamide, dimethylformamide, N-formylmorpholine, N-acetylmorpholine and dimethylpropyleneurea, further more preferably at least one selected from the group consisting of N-ethyl-2-pyrrolidone, N-butyl-2-pyrrolidone, 3-alkoxy-N,N-dimethylpropaneamide, 1,3-dimethyl-2-imidazolidinone, 3-methyl-2-oxazolidinone, N-formylmorpholine, N-acetylmorpholine and dimethylpropyleneurea.

The 3-alkoxy-N,N-dimethylpropaneamide is represented by $N(CH_3)_2COCH_2CH_2OR^{11}$ wherein $R^{11}$ is an alkyl group. The alkoxy group ($R^{11}O$) is not limited, and is preferably an alkoxy group containing a lower alkyl group having 1 to 6 carbon atoms, more preferably a methoxy group, an ethoxy group, a propoxy group, or a butoxy group. The 3-alkoxy-N,N-dimethylpropaneamide is particularly preferably 3-methoxy-N, N-dimethylpropaneamide ($N(CH_3)_2COCH_2CH_2OCH_3$).

The boiling point of the organic solvent is preferably 150° C. or higher, more preferably 170° C. or higher, further more preferably 210° C. or higher. When the boiling point is in this range, the drying rate during coating can be reduced to improve the surface smoothness of the coating film.

The value of the boiling point is measured at 1 atm.

The solid content concentration of the covering composition is preferably 5 to 70 mass %, more preferably 10 mass % or more, and more preferably 60 mass % or less, further more preferably 50 mass % or less, particularly preferably 40 mass % or less.

In some embodiments, the covering composition of the present disclosure may further comprise various additives. The additives are not limited, and examples thereof include fillers, leveling agents, solid lubricants, antisettling agents, moisture absorbers, surfactants, surface conditioners, thixotropy-imparting agents, viscosity control agents, antigelling agents, ultraviolet absorbers, light stabilizers, plasticizers, anti-color separating agents, antiskinning agents, anti-scratch agents, antimolds, antibacterial agents, antioxidants, antistatic agents, silane coupling agents, and colorants (iron oxide, titanium dioxide and the like).

In some embodiments, the covering composition of the present disclosure may comprise a filler as one of the above-described additives for the purpose of imparting characteristics to the resulting covered article, improving the physical properties thereof, and increasing the volume thereof. Examples of the characteristics and physical properties include strength, durability, weather resistance, flame retardancy, and design properties.

The filler is not limited, and examples thereof include wood flour, quartz sand, carbon black, clay, talk, diamond, fluorinated diamond, corundum, silica, boron nitride, boron carbide, silicon carbide, fused alumina, tourmaline, jade, germanium, zirconium oxide, zirconium carbide, chrysoberyl, topaz, beryl, garnet, extender pigments, glittering flat pigments, scale-like pigments, glass, powdered glass, powdered mica, metallic powder (gold, silver, copper, platinum, stainless steel, aluminum and the like), various reinforcing materials, various bulking materials, and conductive fillers.

The content of the additives is preferably 0.01 to 10.0 mass %, more preferably 0.1 to 5.0 mass % with respect to the covering composition.

The viscosity of the covering composition of the present disclosure during coating is more preferably 100 to 300 cP at 25° C. By setting the viscosity within such a range substantially without incorporating methylcellulose, the purpose of the present disclosure can be particularly suitably achieved.

The covering composition of the present disclosure can be used as a covering composition for forming a primer layer in a covering method in which a primer layer is formed on a substrate, followed by formation of a topcoat layer containing a fluorine-containing polymer. Hereinafter, the thus-obtained covered article is sometimes referred to as a first covered article.

In some embodiments, the first covered article may further comprise middle coat layer between the primer layer and the topcoat layer. The middle coat layer is not limited, and can be formed with a known middle coat coating material.

The covering composition of the present disclosure can also be used as a covering composition for forming a middle coat layer of a multi-layered coating film comprising a primer layer containing a heat-resistant resin, a middle coat layer, and a topcoat layer containing a fluorine-containing polymer. Hereinafter, the thus-obtained covered article is sometimes referred to as a second covered article.

These use methods are similar to those in Japanese Patent Laid-Open No. 2020-176216 filed by the present applicant. As use methods, those similar to the use methods described in the prior art document may be employed.

The substrate may be, for example, a substrate made from metal or a non-metal inorganic material, preferably metal, more preferably aluminum or stainless steel.

Examples of the metal include single metals such as iron, aluminum and copper, and alloys thereof. Examples of the alloy include stainless steel.

Examples of the non-metal inorganic material include enamel, glass and ceramics.

For example, in addition to metal or a non-metal inorganic material, other materials may be contained in the substrate.

In some embodiments, the substrate may be subjected to surface treatment such as degreasing treatment or roughing treatment as necessary. The method of the roughing treatment is not limited, and examples thereof include chemical etching with acid or alkali, anode oxidation (alumite treatment), sand blasting. The surface treatment may be appropriately selected according to the types of the substrate and the covering composition and the like, and for example, sand blasting is preferable.

The substrate may be subjected to degreasing treatment in which heating is performed at 380° C. in an empty state to pyrolyze and remove impurities such as oil. Alternatively, an aluminum substrate subjected to roughing treatment with an alumina grinding material after surface treatment may be used.

The method for applying the covering composition onto the substrate or the heat-resistant layer is not limited, and when the covering composition is liquid, examples of the method include spray coating, roll coating, doctor blade coating, dip coating, impregnation coating, spin flow coating, and curtain flow coating. Among them, spray coating is preferable. When the covering composition is powdery, examples of the method include electrostatic coating, a fluidized bed coating method, and a rotolining method. Among them, electrostatic coating is preferable.

In the present disclosure, bubbling is suppressed by being substantially free from methylcellulose as described above, and problems associated with the bubbling occur notably in the case where spray coating is performed using a low-pressure atomization coating gun with an atomizing pressure of less than 0.2 Mpa. Therefore, an effect can be particularly suitably exhibited when coating is performed with a spray using a low-pressure atomization gun.

In some embodiments, drying may be performed after application of the covering composition. It is preferable to perform the drying at a temperature of 70 to 300° C. for 5 to 60 minutes. It is preferable to further perform sintering at a temperature of 260 to 410° C. for 10 to 30 minutes.

When the covering composition of the present disclosure is used for formation of a primer layer in the first covered article, the thickness of the primer layer is preferably 5 to 90 μm. If the thickness is excessively small, pinholes are likely to be generated, and the corrosion resistance of the covered article may be deteriorated. If the thickness is excessively large, cracks are likely to be generated, and the water vapor resistance of the covered article may be deteriorated. When the primer layer is formed from a liquid composition, the upper limit of the thickness of the primer layer is more preferably 60 μm, further more preferably 50 μm. When the primer layer is formed from a powdery composition, the upper limit of the thickness of the primer layer is more preferably 80 μm, further more preferably 70 μm.

The first covered article comprises such a primer layer, and a topcoat layer containing a fluorine-containing polymer. The topcoat layer may be similar to the fluorine-containing layer described in detail in Japanese Patent Laid-Open No. 2020-176216 filed by the present applicant.

The thickness of the fluorine-containing layer is preferably 5 to 90 μm. An excessively small thickness may deteriorate the corrosion resistance of the covered article. An excessively large thickness may lead to poor water vapor resistance as water vapor is likely to remain in the covered article when the covered article is in the presence of water vapor. When the fluorine-containing layer is formed from a liquid composition, the upper limit of the thickness of the fluorine-containing layer is more preferably 60 μm, further more preferably 50 μm, particularly preferably 40 μm. When the fluorine-containing layer is formed from a powdery composition, the upper limit of the thickness of the fluorine-containing layer is more preferably 80 μm, further more preferably 75 μm, particularly preferably 70 μm.

The primer layer is preferably in direct contact with the substrate.

The fluorine-containing layer may be in contact with the primer layer directly or with another layer interposed therebetween, and is preferably in direct contact with the primer layer.

The covering composition of the present disclosure can give a coating film excellent in corrosion resistance, and the first and second covered articles are excellent in corrosion resistance. For this reason, the covering composition of the present disclosure and the first and second covered articles can be suitably used in any fields where corrosion resistance is required. The relevant uses are not limited, and examples thereof include uses that rely on the non-stickiness, heat resistance, lubricity and the like of the fluorine-containing polymer. For example, those that rely on the non-stickiness include cookware such as frying pans, pressure cookers, pots, grill pots, rice cookers, ovens, hot plates, bread baking ovens, kitchen knives and gas tables; kitchen utensils such as electric pots, ice cube trays, molds and cooking range hoods; food industry parts such as mixing mills, mill rolls, conveyers and hoppers; industrial articles such as rolls for office automation (QA), belts for OA, separation claws for QA, paper making rolls and calendering rolls for film production; molds and matrixes for molding of expanded polystyrene and the like; mold release plates such as release plates for plywood/decorative plate production; and industrial containers (particularly for semiconductor industries), and those that rely on the lubricity include tools such as medical guide wires, catheters, sheaths, sheath introducers, saws and files; household articles such as irons, scissors and kitchen knives; metal foils; electric wires; plain sleeve bearings of food processors, wrapping machines, spinning and weaving machines and the like; slide parts of cameras and clocks; automobile parts such as pipes, valves and bearings; snow shovels; plows; and chutes.

The covering compositions of the present disclosure, and the first and second covered articles are used preferably for cookware or kitchen utensils, more preferably for cookware, further more preferably for rice cookers.

In addition, the first and second covered articles are preferably cookware, kitchen utensils or constituent members thereof, more preferably cookware or constituent members thereof, further more preferably rice cookers or constituent members thereof.

EXAMPLES

Hereinafter, the present disclosure will be described in detail by way of Examples.

In Examples below, the terms “part” and “%” mean “part by mass” and “mass %”, respectively, unless otherwise specified.

The average particle size was measured by a laser diffraction-type particle size distribution measurement apparatus (Microtrac MT-3000 EXII Model manufactured by MicrotracBEL Corp.). The thickness was measured using a high-frequency-type film thickness meter (trade name: LZ-300C, manufactured by Kett Electric Laboratory Co., Ltd.).

Production Example 1

Preparation of Polyamide Imide Resin Aqueous Dispersion (1)

A polyamide imide [PAI] resin varnish having a solid content of 29% (containing 71% of N-methyl-2-pyrrolidone (hereinafter, referred to NMP)) was put in water to precipitate PAI. The precipitate was crushed in a ball mill for 48 hours to obtain a PAI aqueous dispersion (average particle size: 2 μm). The obtained PAI aqueous dispersion had a solid content of 20%.

Production Example 2

Preparation of Polyether Sulfone Resin Aqueous Dispersion (1)

In a ceramic ball mill, 60 parts of a polyether sulfone [PES] resin having a number average molecular weight of about 24,000 and 60 parts of deionized water were stirred for about 10 minutes until the particles of PES were completely crushed. Subsequently, 180 parts of NMP was added, and the mixture was crushed for 48 hours to obtain a dispersion. The obtained dispersion was further crushed with a sand mill for 1 hour to obtain a PES aqueous dispersion having a PES concentration of about 20% (average particle size: 2 μm).

Production Example 3 (Covering Composition of the Present Disclosure: Example 1)

To the PAI aqueous dispersion obtained in Production Example 1, a tetrafluoroethylene homopolymer [TFE homopolymer, hereinafter referred to as PTFE] aqueous dispersion (average particle size: 0.28 μm, solid content: 60%, containing a non-alkyl phenol-type polyether-based nonionic surfactant as a dispersant in an amount of 6% with respect to PTFE) and a tetrafluoroethylene/hexafluoropropylene copolymer (hereinafter, referred to as FEP) aqueous dispersion (average particle size: 0.20 μm, solid content: 60%, containing a non-alkyl phenol-type polyether-based nonionic surfactant as a dispersant in an amount of 5% with respect to FEP) were added so that the mass ratio of FEP to PTFE was 8.4% on a solid content basis, and the amount of PAI was 25% of the total amount of PAI, PTFE and FEP on a solid content basis. To this, a non-alkyl phenol-type polyether-based nonionic surfactant (HLB value: 9.5) was added as a thickener in an amount of 11% with respect to the polymer solid content to obtain an aqueous dispersion with a polymer solid content of 37% (covering composition (1) for basecoat).

Production Example 4 (Covering Compositions of the Present Disclosure: Examples 2, 3 and 5)

The PES aqueous dispersion obtained in Production Example 2 and the PAI aqueous dispersion obtained in Production Example 1 were mixed so that the amount of PES was 75% of the total amount of PES and PAI on a solid content basis. To the mixture, a tetrafluoroethylene homopolymer [TFE homopolymer, hereinafter referred to as PTFE] aqueous dispersion (average particle size: 0.28 μm, solid content: 60%, containing a non-alkyl phenol-type polyether-based nonionic surfactant as a dispersant in an amount of 6% with respect to PTFE) and a tetrafluoroethylene/hexafluoropropylene copolymer (hereinafter, referred to as FEP) aqueous dispersion (average particle size: 0.20 μm, solid content: 60%, containing a polyether-based nonionic surfactant as a dispersant in an amount of 5% with respect to FEP) were added so that the mass ratio of FEP to PTFE was 50% on a solid content basis, and the amount of PES and PAI was 25% of the total amount of PES, PAI, PTFE and FEP on a solid content basis. To this, a non-alkyl phenol-type polyether-based nonionic surfactant (HLB value: 9.5) was added as a thickener in an amount of 11% with respect to the polymer solid content to obtain an aqueous dispersion with a polymer solid content of 37% (covering composition (2) for basecoat).

Production Example 5 (Covering Composition of the Present Disclosure: Example 4)

Except that methylcellulose was added in an amount of 0.068% with respect to the polymer solid content, the same procedure as in Production Example 4 was carried out to obtain a covering composition (3) for basecoat with a polymer solid content of 36%.

Comparative Production Example 1

Except that instead of the non-alkyl phenol-type polyether-based nonionic surfactant (HLB value: 9.5), methylcellulose was added as a thickener in an amount of 0.61% with respect to the polymer solid content, the same procedure as in Production Example 3 was carried out to obtain a covering composition (4) for basecoat with a polymer solid content of 33%.

Comparative Production Example 2

Except that instead of the non-alkyl phenol-type polyether-based nonionic surfactant (HLB value: 9.5), methylcellulose was added as a thickener in an amount of 0.61% with respect to the polymer solid content, the same procedure as in Production Example 4 was carried out to obtain a covering composition (5) for basecoat with a polymer solid content of 33%.

Comparative Production Example 3

Except that methylcellulose was added in an amount of 0.14% with respect to the polymer solid content, the same procedure as in Production Example 4 was carried out to obtain a covering composition (6) for basecoat with a polymer solid content of 36%.

<Production of Test Plate>

A surface of a 1.5 mm-thick aluminum plate (A-1050P) cut into a length of 5 cm and a width of 10 cm was degreased with acetone, and then roughed by performing sand blasting so that the surface roughness Ra value measured in accordance with JIS B 1982 was 2.5 to 4.0 μm. Dust on the surface was removed by air blowing, and the covering composition for basecoat which had been obtained in each of Production Examples and Comparative Production Examples was then applied by spray coating at a spraying pressure of 0.2 MPa using Model RG-2 Gravity Spray Gun (trade name, manufactured by ANEST IWATA Corporation, nozzle diameter: 1.0 mm) so that the thickness was about 10 μm in a dry state. The obtained coating film on the aluminum plate was dried at 80 to 100° C. for 15 minutes, and cooled to room temperature.

A PTFE aqueous coating material (POLYFLON PTFE EK-3700C 21R manufactured by Daikin Industries, Ltd.) or a PFA powder coating material (NEOFLON PFA ACX-34 manufactured by Daikin Industries, Ltd.) was applied onto the obtained coating film.

In Example 5, ACX-34 mixed with silicon carbide in an amount of 2.0 mass % was applied as the middle coat, and ACX-34 mixed with glass flakes in an amount of 1.5 mass % and diamond powder in an amount of 1.0 mass % was applied as the topcoat.

In the case of the PTFE aqueous coating material, the coating material was applied by spray coating at a spraying pressure of 0.2 MPa using Model RG-2 Gravity Spray Gun (trade name, manufactured by ANEST IWATA Corporation, nozzle diameter: 1.0 mm), sintered at 380° C. for 20 minutes, and cooled to form a PTFE layer having a thickness of about 20 μm as the topcoat, thereby obtaining a test coated plate. In the obtained test coated plate, a basecoat layer and a topcoat layer made from PTFE were formed on an aluminum plate.

When the topcoat was ACX-34, the coating material was electrostatically applied under conditions of an applied voltage of 40 KV and a pressure of 0.08 MPa, sintered at 380° C. for 20 minutes, and cooled to form a PFA layer having a thickness of about 40 μm as the topcoat, thereby obtaining a test coated plate. In the obtained test coated plate, a basecoat layer and a topcoat layer made from PFA were formed on an aluminum plate.

When the middle coat was a filler-containing powder coating material, ACX-34 containing silicon carbide was electrostatically applied under conditions of an applied voltage of 40 KV and a pressure of 0.08 MPa, and subsequently, ACX-34 containing glass flakes and diamond powder was also electrostatically applied as the topcoat. The applied coating materials were sintered at 380° C. for 20 minutes, and cooled to form a filler-containing PFA (containing 98% of PFA and 2% of silicon carbide) layer having a thickness of about 40 μm as the middle coat and a filler-containing PFA (containing 97.5% of PFA, 1.5% of glass flakes and 1.0% of diamond powder) layer having a thickness of about 5 μm as the topcoat, thereby obtaining a test coated plate. In the obtained test coated plate, a basecoat layer, a middle coat layer made from PFA and silicon carbide, and a topcoat layer made from PFA, glass flakes and diamond powder were formed on an aluminum plate. A corrosion resistance test was conducted on the coated plates obtained as described above.

<Evaluation Method>

The following evaluation was performed.

(Coating Test for Covering Composition for Basecoat)

A surface of a 1.5 mm-thick aluminum plate (A-1050P) cut into a length of 5 cm and a width of 10 cm was degreased with acetone, and the covering composition for basecoat which had been obtained in each of Examples and Comparative Examples was then applied by spray coating at a spraying pressure of 0.1 MPa using Model W-101 Gravity Spray Gun (trade name, manufactured by ANEST IWATA Corporation, nozzle diameter: 1.2 mm) so that the thickness was about 10 μm in a dry state. The number of bubbles immediately after the application was examined.

(Corrosion Test for Coated Plate)

A crosscut was made in a coating film surface of the obtained test coated plate with a cutter knife, so that the scratch extended to the substrate. The test plate was immersed in a solution of 20 g of mix: Oden No Moto (manufactured by S&B FOODS INC.) in 1 liter of water. With the temperature maintained at 70° C., the test plate having a crosscut made with the cutter knife was immersed for 1,000 hours. Blisters in the crosscut portion were counted.

Scores were given on the basis of the following criteria.

Score 5: There were no blisters.

Score 4: There were 3 or less blisters of 3 mm or less.

Score 3: There were 4 to 6 blisters, or there was a blister of 4 mm or more.

Score 2: There were 7 to 10 blisters, or there is a blister of 10 mm or more, or there were 3 or more blisters of 4 mm or more.

Score 1: There were 11 or more blisters.

(Viscosity of Coating Material)

The viscosity was measured under conditions of No. 2 rotor, 60 rpm and 25° C. using a B-type viscometer (Model TVB10 manufactured by TOKISANGYO).

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Basecoat | Covering composition for basecoat | (1) | (2) | (2) | (3) | (2) | (4) | (5) | (6) |
| | Viscosity of coating material (cP) | 135 | 233 | 233 | 237 | 233 | 135 | 190 | 250 |
| | Solid content (mass %) | 37 | 37 | 37 | 36 | 37 | 33 | 33 | 35 |
| | Added amount of methylcellulose (with respect to covering composition) | 0 mass % | 0 mass % | 0 mass % | 0.025 mass % | 0 mass % | 0.20 mass % | 0.20 mass % | 0.050 mass % |
| | Added amount of methylcellulose (with respect to solid content) | 0 mass % | 0 mass % | 0 mass % | 0.068 mass % | 0 mass % | 0.61 mass % | 0.61 mass % | 0.14 mass % |
| | Nonionic surfactant (HLB 9.5) (with respect to covering composition) | 4.2 mass % | 4.2 mass % | 4.2 mass % | 4.2 mass % | 4.2 mass % | 0.8 mass % | 1.9 mass % | 4.2 mass % |
| | Film thickness (μm) | 10 | 10 | 10 | 10 | 10 | 10 | 10 | 10 |
| Middle coat | Powder coating material | None | None | None | None | Filler-containing PFA powder coating material | None | None | None |
| | Type of filler | — | — | — | — | Silicon carbide | — | — | — |
| | Added amount of filler | — | — | — | — | 2.0 mass % | — | — | — |
| | Film thickness (μm) | — | — | — | — | 40 | — | — | — |
| Topcoat | Aqueous coating material | EK-3700C21R | EK-3700C21R | — | — | — | EK-3700C21R | — | — |
| | Powder coating material | — | — | ACX-34 | ACX-34 | Filler-containing PFA powder coating material | — | ACX-34 | ACX-34 |

TABLE 1-continued

| | Example 1 | Example 2 | Example 3 | Example 4 | Example 5 | Comparative Example 1 | Comparative Example 2 | Comparative Example 3 |
|---|---|---|---|---|---|---|---|---|
| Type of filler A | — | — | — | — | Glass flake | — | — | — |
| Added amount of filler A | — | — | — | — | 1.5 mass % | — | — | — |
| Type of filler B | — | — | — | — | Diamond powder | — | — | — |
| Added amount of filler B | — | — | — | — | 1.0 mass % | — | — | — |
| Film thickness (μm) | 20 | 20 | 40 | 40 | 5 | 20 | 40 | 40 |
| Number of bubbles immediately after basecoat application | 0 | 0 | 0 | 0 | 0 | 130 | 135 | 120 |
| Corrosion resistance | Score 3 | Score 5 | Score 5 | Score 5 | Score 5 | Score 1 | Score 4 | Score 4 |

The results of Table 1 showed that in the covering composition of the present disclosure, bubbling was suppressed. Accordingly, a coating film having excellent coating film properties can be formed.

INDUSTRIAL APPLICABILITY

The covering composition of the present disclosure can be suitably used for applications where corrosion resistance is required. The covering composition can be particularly suitably used for cookware or kitchen utensils.

What is claimed is:

1. A covering composition in which a heat-resistant resin (A), a non melt-processible fluorine-containing polymer (B), a melt-processible fluorine-containing polymer (C), and a nonionic surfactant having a HLB of 10 or lower are dispersed in a water medium, wherein the particulate resins (A) to (C) have an average particle size of 0.1 to 10 μm, and wherein the covering composition comprises less than 0.050 mass % of methylcellulose.

2. The covering composition according to claim 1, wherein the heat-resistant resin (A) is polyamide imide and/or polyimide (A-1).

3. The covering composition according to claim 1, wherein the heat-resistant resin (A) is polyamide imide and/or polyimide (A-1), and polyether sulfone (A-2).

4. The covering composition according to claim 3, wherein a mass ratio of polyamide imide and/or polyimide (A-1) to polyether sulfone (A-2) ((A-1):(A-2)) is 85:15 to 65:35, and wherein a mass ratio of the total amount of polyether sulfone and polyamide imide and/or polyimide (A) to the total amount of the non melt-processible fluorine-containing polymer (B) and the melt-processible fluorine-containing polymer (C) ((A):(B)+(C)) is 15:85 to 35:65.

5. The covering composition according to claim 1, wherein the non melt-processible fluorine-containing polymer (B) is polytetrafluoroethylene and/or modified polytetrafluoroethylene.

6. The covering composition according to claim 1, wherein the melt-processible fluorine-containing resin polymer (C) is a tetrafluoroethylene/hexafluoropropylene copolymer (FEP) and/or a tetrafluoroethylene/perfluoroalkyl vinyl ether copolymer (PFA).

7. The covering composition according to claim 1, wherein the covering composition is directly applied onto a substrate made from metal or a non-metal inorganic material, or applied onto a layer made from a heat-resistant resin.

8. A covered article comprising:

a substrate;

a primer layer formed by directly applying the covering composition of claim 1 to the substrate; and a topcoat layer containing a fluorine-containing polymer.

9. The covered article according to claim 8, further comprising a middle coat layer between the primer layer and the topcoat layer.

10. The covering composition according to claim 1, wherein a viscosity of the covering composition is 100 to 300 cP at 25° C.

11. The covering composition according to claim 1, wherein the amount of the nonionic surfactant having an HLB of 10 or lower is 3.0 to 8.0 mass %.

* * * * *